A. H. HART.
Bee Hive.
No. 67,649.  Patented Aug. 13, 1867.
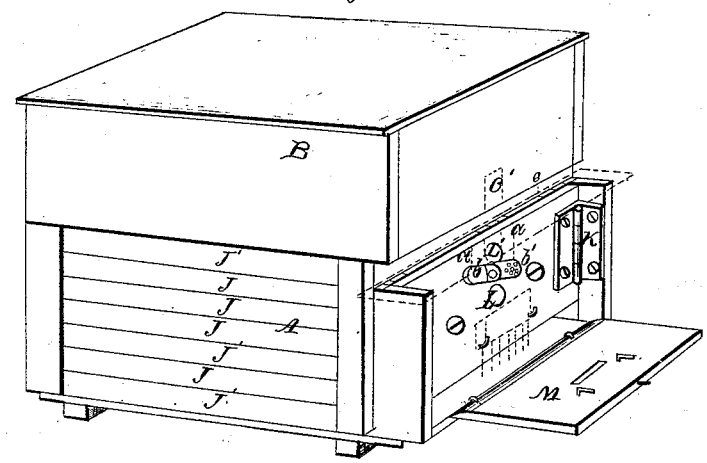
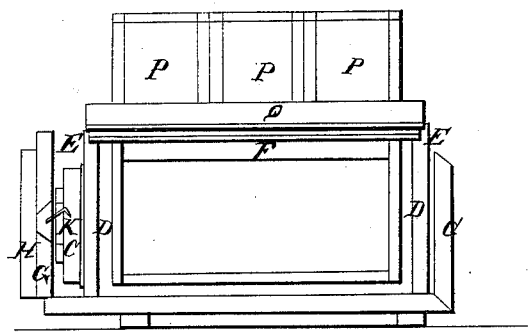
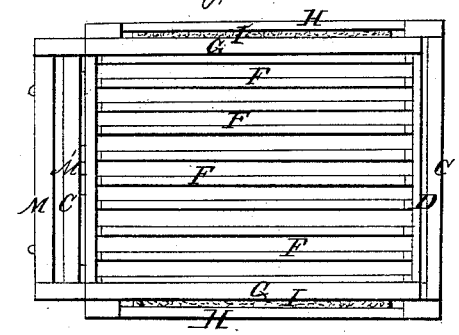
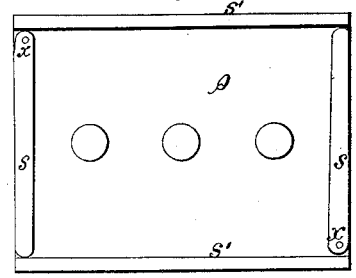
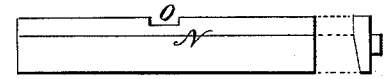
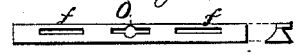
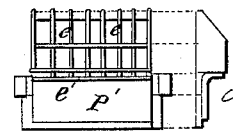
Witnesses:  Inventor
W. H. Burridge  A. H. Hart
G. H. Burridge

United States Patent Office.

A. H. HART, OF STOCKBRIDGE, WISCONSIN.

Letters Patent No. 67,649, dated August 13, 1867.

---

IMPROVEMENT IN BEE-HIVES.

---

The Schedule referred to in these Letters Patent and making part of the same.

---

TO ALL WHOM IT MAY CONCERN:

Be it known that I, A. H. HART, of Stockbridge, in the county of Calumet, and State of Wisconsin, have invented certain new and useful improvements in Bee-Hives; and I do hereby declare that the following is a full and complete description of the construction of the same, reference being had to the accompanying drawings, making a part of this specification, in which—

Figure 1 is a perspective view of the hive.
Figure 2 is a side view with the top detached.
Figure 3 is a top view with the top detached.
Figures 4, 5, 6, and 7 are detached sections, to which reference will be made.
Like letters of reference refer to like parts in the several views.

This hive is constructed in two sections, A and B, fig. 1; A being the body of the hive, in which are arranged the comb-frames, and B the honey-chamber, in which are placed the honey-boxes. A, the body of the hive, is constructed with double walls, as shown in fig. 2, C being the outer one, and D the inner. Along the upper edge of the inner walls is cut a rabbet, E, upon which are hung the comb-frames F, which are movable, and more or less in number, according to the size of the hive. The walls above indicated are the end walls of the hive, and the spaces between them are not filled up with any non-conducting material, but are left open, as dead-air chambers. The side walls of the hive are constructed in like manner, but are not left open, but are lathed and plastered, or filled up with an equivalent as a non-conductor of extreme heat and cold. This filling is shown in fig. 3, in which G represents the inner wall, H the outer, and I the filling. In fig. 1, J is the plastering referred to, and J' the lath of which the outer wall is constructed. These side walls are so hinged to the ends of the hive by the butts K as to permit of their being swung open, as shown in fig. 2, whereby entire access is had to the comb-frames. The outer wall of the rear end is so arranged as to be detached. In the front end of the hive are the holes L L', for the purpose of ventilation; the lower hole L opens directly into the body of the hive, while the upper one opens into the honey-chamber above, by means of the passage formed by the cross-pieces placed between the walls, indicated by the dotted lines a. By this arrangement of the holes they are prevented from being stopped or obstructed by the snow of winter, and at the same time afford a full and complete ventilation to the body and upper part of the hive, and are easily regulated and completely closed, if so desired, by the button b, or protected from the entrance of the bee-moth by the guard b'. For a further protection to the hive against the cold of winter, the alighting-board M, fig. 1, being hinged to the bottom of the hive, can be raised up to a vertical position, so as to be close to the front of the hive, leaving a space between it and the board. The board in this position is shown in fig. 3, in which M is the upturned board, and M' the space referred to. The cross-board N, fig. 5, is placed across the top of the projecting ends of the sides, to which the butts are secured, as indicated by the dotted lines c, fig. 1, and thus forming a roof to the portico enclosing the front of the hive. The notch O, observed in the middle of this cross-piece, is to provide for the ventilating passage to the upper part of the hive referred to, a corresponding groove being cut in the end of the front of the upper section, as indicated by the dotted lines c'. O', fig. 6, is a bee-gauge block, the practical use of which is, by its different adjustment the hive is closed against the issuing at all of the bees, or by changing this close position to another, it will admit the passage of two or three. P', fig. 7, is a drone-trap; this trap is constructed of tin, and is provided with a number of adjustable wires, e, which are so connected to the inner side of the frame e' as to allow them to fly backward and forward sufficiently to allow the passage of a drone. This trap is secured to the bee-door when closed, by the gauge-block, when placed there in the position shown in fig. 6. The side openings f in this block admit the passage of the working-bees, but not the drones; the latter must pass through the larger opening in the centre. Over this centre door o is placed the drone-trap, as shown in fig. 1. The drones, on pressing against the wires from the inside, push them outward, and they pass through, but cannot return, as the wires close the door, and cannot be pushed back in that direction, hence the drones are excluded from the hive, and can then be either killed or they perish from exposure and want, as they are only consumers, and when in superabundance a loss to the bee-master. By this arrangement of the gauge-block and trap complete control is given to the bee-master over the hive and colony, and whereby he can regulate their movements and the number of the drones, as circumstances may indicate.

The upper section of this hive, as above said, is the honey-chamber. This chamber consists of the box or case, which is made to fit down over the edge of the body, making a miller-tight joint. In order to obtain access to the honey-boxes, this case is lifted from the lower section, and when thus removed the honey-boxes are seen arranged as shown in fig. 2, in which P are the boxes. These boxes may be more or less in number, and are constructed in the ordinary way, with a glass end, for the purpose of seeing into them.

Q, fig. 4, is the honey-board, and is placed over the top of the comb-frames, as shown in fig. 2, and upon which the honey-boxes are arranged, so that the bee-hole in the bottom of the box conforms with the holes in the board, and through which the bees pass from the frames into the boxes. This board is provided with a raised rim around its four sides; those on the longest sides S' are fixed, whereas those at the shorter sides S are adjustable by being pivoted to the board at the point X. This permits of their being turned in either way, for the greater convenience of removing the boxes from off the board, as a knife or other thin implement can then be thrust under them, in order to loosen or detach them from the board. In winter this board can be turned over, and the space between the top of the frames and board, caused by the rim, may be filled with any suitable material as an absorbent for the purpose of taking up the moisture or exhalation from the bees. It also adds to the warmth of the hive, thus keeping the bees in better condition and health.

Of the several advantages this hive has over others, we instance the following: Being made to open at the sides, the comb can be handled or removed with greater safety, as the comb, when drawn from the top, is quite liable to be injured, and the bees more disturbed. The comb beings more or less wavering, it is often very difficult to get out the first frames or combs, as they are often attached to the sides and bottom. Also, an examination of the condition of the colony without removing the frames can be more fully made by thus having the sides of the hive open as described. The lath and plastering, or its equivalent, together with the double walls at the end, being a non-conductor of extreme heat or cold, the hive is cooler in summer and warmer in winter; therefore the bees will not leave the hive in summer, in consequence of the extreme heat within, and rest or sleep on the outside. Also, it being warmer in winter, the exhalations of the bees will pass off through the ventilation before freezing and making frost in the hive, and thus the bees can be wintered in better condition and health. The arrangement of the front end board so that a space is left between that and the inner one, and in which inner one holes are made for bee-passages and for ventilating the hive from above, and which passages are protected by the front board, thus prevents the snow from drifting into and closing them up.

The arrangement of the gauge-block in the manner as described, whereby the hive is closed or opened, thus completely controlling the movements of the bees, and by the application of the drone-trap regulating the number and movements of the drones, and by the same means the introduction of the Italian and Egyptian bees can be successfully managed.

The alighting-board, by its size and position, gives to the bees an easy access to the hive, and when returning loaded, wet, or chilled, they can thus enter the hive without effort, and by this means thousands of bees can be saved from perishing, as they often drop at the entrance of the hive from exhaustion, cold, and wet. Should an attack be made by robber bees, this board can be raised, and thus protect the hive from the robbers. The board forming a space in the portico, the robbing bees passing through the slot in the board, which may be guarded by a drone-trap above described, are captured and either killed or adopted.

Another advantage of this board is, it being closed in winter, helps to keep up the warmth of the hive, and effectually secures it against rats and mice. The construction of the honey-board with a rim, so as to be used in the winter as an absorbent-box, and its convenience for removing the honey-boxes.

What I claim as my improvement, and desire to secure by Letters Patent, is—

1. The lathed and plastered walls H in combination with the filled space I, as and for the purpose substantially set forth.

2. The special arrangement of the ventilating-holes L L' and passage-way a, in combination with the honey-chamber B, and body of the hive A, as and for the purpose described.

3. The adjustable bee-gauge block O', provided with the bee-doors $f f'$, as arranged, in combination with the drone-trap P', for the purpose and in the manner as substantially set forth.

A. H. HART.

Witnesses:
M. H. ALLEN,
E. W. SCOTT.